Nov 24, 1953 W. WIESNER ET AL 2,660,442
CONVERTIBLE VEHICLE
Filed July 10, 1951 4 Sheets-Sheet 1

INVENTORS
WAYNE WIESNER
FRANK FIELD
BY
*Mellin and Hanson*
ATTORNEYS

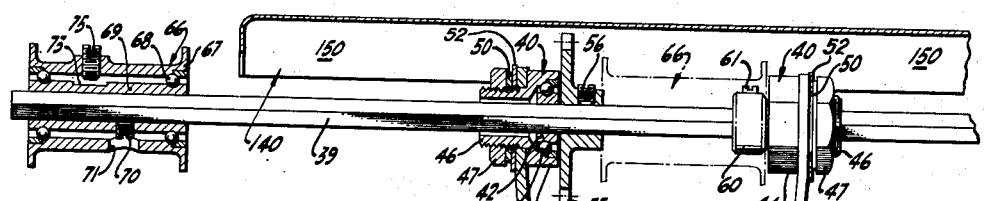
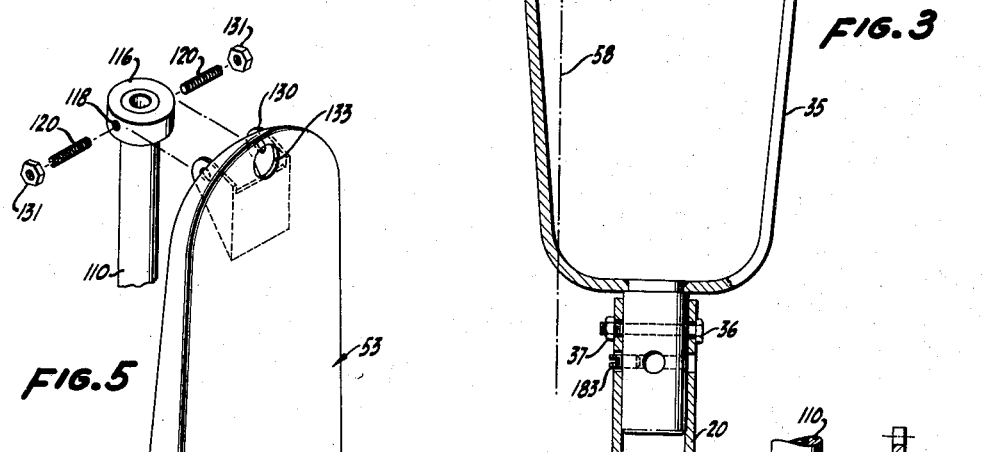
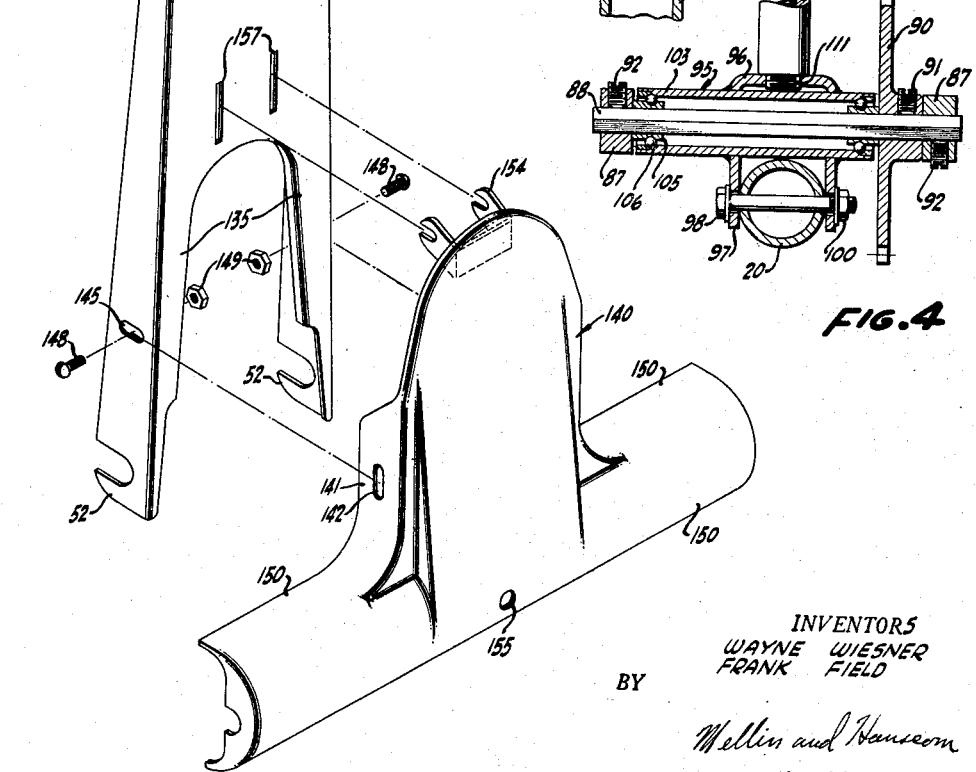

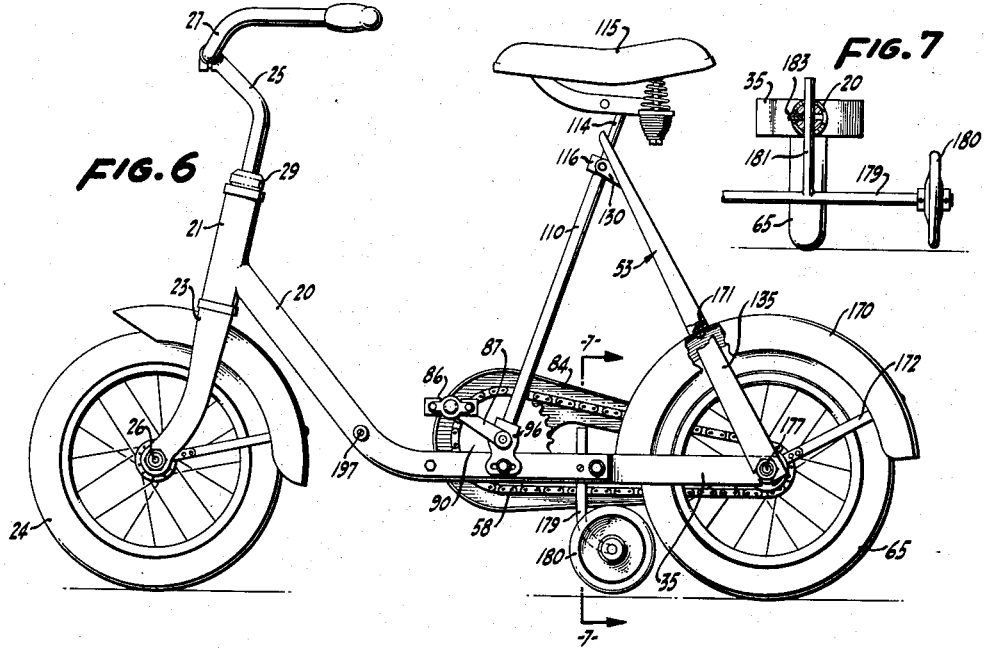
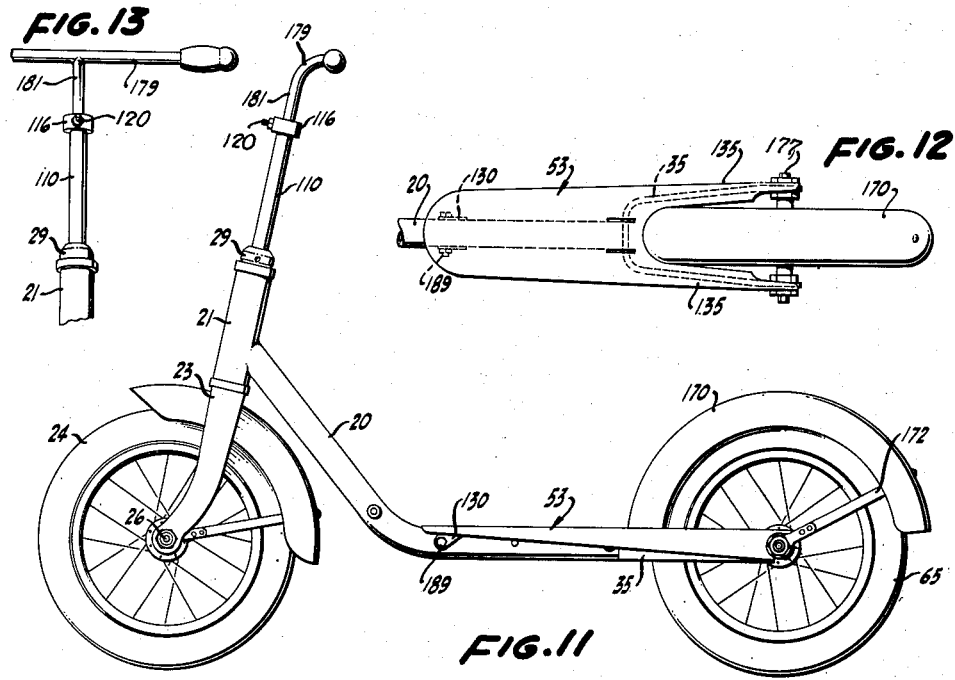

Nov. 24, 1953    W. WIESNER ET AL    2,660,442
CONVERTIBLE VEHICLE
Filed July 10, 1951    4 Sheets-Sheet 4
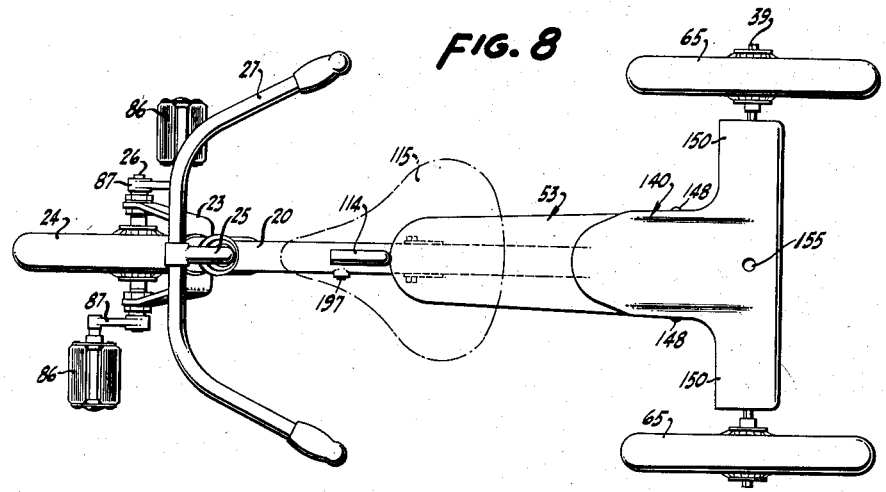
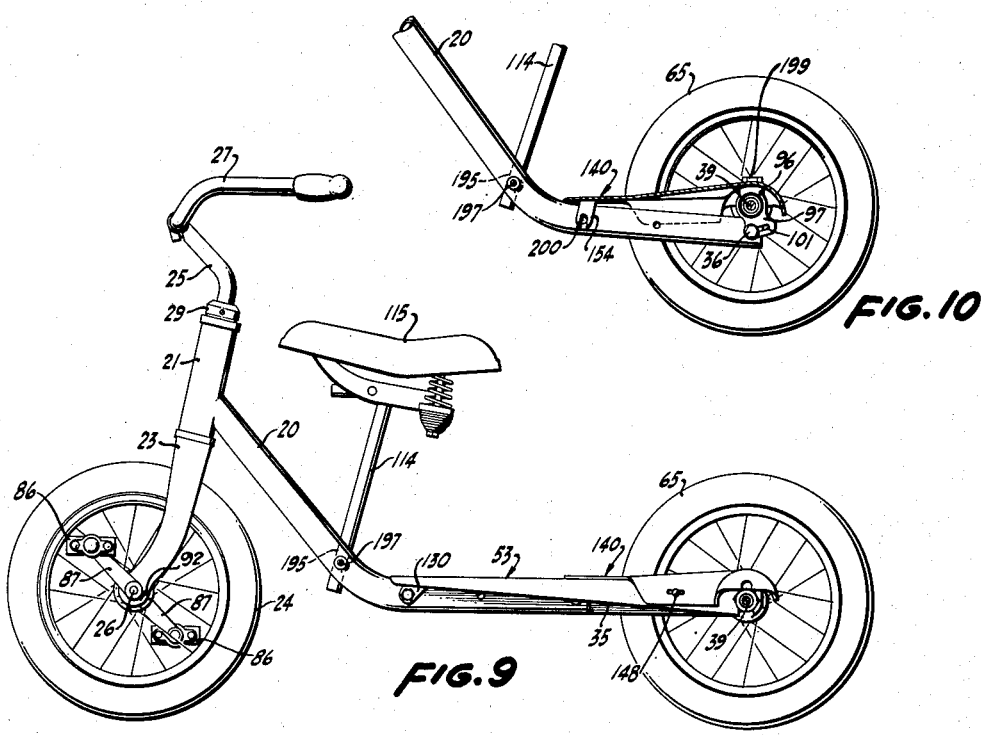
INVENTORS
WAYNE WIESNER
FRANK FIELD
BY
Mellin and Hanscom
ATTORNEYS Patented Nov. 24, 1953

2,660,442

UNITED STATES PATENT OFFICE 2,660,442

CONVERTIBLE VEHICLE

Wayne Wiesner and Frank Field,
Palo Alto, Calif.

Application July 10, 1951, Serial No. 235,986

19 Claims. (Cl. 280—7.1)

This invention relates to a convertible vehicle.

A main object of the present invention is to provide a vehicle that is convertible into a multiplicity of common types of vehicles so that it is necessary for a purchaser to buy only the convertible vehicle embodying the concepts of the present invention and not a plurality of separate vehicles as would otherwise be required.

More particularly, a main object of the present invention is to provide a convertible vehicle convertible into, among other types of vehicles, a rear drive tricycle, a short frame, front wheel drive tricycle, a long frame, front wheel drive tricycle, a bicycle, and a scooter.

A principal object of the present invention is to provide a convertible vehicle as above described that is simple in construction and requires a minimum number of parts, and which vehicle requires a minimum amount of garage space.

Various other objects of the present invention will be apparent from the following description taken in conjunction with the accompanying drawings, wherein:

Fig. 1 is a side view in elevation of a vehicle embodying the concepts of the present invention, Fig. 1 depicting a rear drive tricycle.

Fig. 2 is a plan view of the vehicle depicted in Fig. 1.

Fig. 3 is a fragmentary, enlarged sectional view along the line 3—3 of Fig. 1 showing the rear axle mounting and drive.

Fig. 4 is a cross-sectional view taken along the line 4—4 of Fig. 1.

Fig. 5 is an exploded view of the step plate and foot rest member.

Fig. 6 is a view in elevation of a bicycle having an outrigger thereon, said bicycle being one of the forms into which the vehicle of the present invention can be converted.

Fig. 7 is a fragmentary, sectional view along line 7—7 of Fig. 6.

Fig. 8 is a top plan view of a long frame, front wheel drive tricycle which can be produced by a rearrangement and appropriate selections of parts of the device disclosed in Figs. 1 and 2.

Fig. 9 is an elevation view of the device disclosed in Fig. 8.

Fig. 10 is a fragmentary view of a short frame, front drive tricycle which can be produced by a rearrangement and proper selection of the parts disclosed in Figs. 1 and 2.

Fig. 11 is a view in elevation of a scooter which can be produced by a proper selection and rearrangement of the parts of the tricycle disclosed in Figs. 1 and 2, plus the outrigger T-frame disclosed in Fig. 6.

Fig. 12 is a plan view of a portion of the device disclosed in Fig. 11.

Fig. 13 is a fragmentary front view in elevation of the device disclosed in Fig. 11.

Referring to the accompanying drawings, wherein similar reference characters designate similar parts throughout, the device disclosed in Figs. 1 and 2 comprises a frame 20 having a front bearing 21 rotatably receiving the shank (not shown) of a fork 23, said fork rotatably supporting a front wheel 24. Drivingly connected to the upper end of fork 23 within the bearing 21 is the lower end of the shank 25 of handle bars 27, the fork 23 and shank 25 being suitably detachably connected together in a fashion which is well known in the art. A lock collar 29 is secured to shank 25 by a set screw 30 to limit downward movement of the shank 25.

Frame 20 has a rear fork 35 detachably secured to frame 20 by means of a bolt 36 and nut 37, said rear fork forming an extension for frame 20 and permitting the frame to be shortened by the removal of the extension 35. A rear axle 39 is rotatably supported by fork 35 by means of bearings 40 (see Fig. 3). Bearings 40 have inner races 42, balls 43 and outer races 44, said outer races being formed with threaded nipple portions 46 which receive nuts 47. The prongs of fork 35 are suitably apertured to receive the nipples 46, as clearly shown in Fig. 3, and washers 50 are provided whereby the prongs of rear fork 35 are clamped between the nut 47 and the outer races 44 of the bearings 40. There are bifurcated portions 52 of a foot rest member 53 also clamped between nuts 47 and outer races 44 but the construction of foot rest 53 will be described more in detail hereinafter.

There is a sprocket 55 removably fixed to rear axle 39 by means of a set screw 56, said sprocket being disposed adjacent the inner race 42 of the left-hand bearing, as the parts are depicted in Fig. 3, and adapted to be driven by means of a chain 58. A collar 60 is secured by set screw 61 to the shaft 39 and is disposed adjacent the inner race 42 of the right-hand bearing, as the parts are depicted in Fig. 3, for the purpose of limiting axial movement of axle 39.

There are rear wheels 65 rotatably mounted on the ends of the shaft 39, each wheel including a bearing 66 having an outer race 67, balls 68 and an inner race 69 secured to axle 39 by means of a set screw 70 which is manipulated through an opening 71 provided in the outer race 67. The inner race 69 is provided with a flat 73 to cooperate with a set screw 75 threadedly secured by the outer race 67 to prevent rotation between the outer race and inner race and therefore allow driving of wheels 65 through axle 39.

In providing a rear wheel drive tricycle, one of the wheels 65 will be non-rotatably secured to axle 39, whereas the other wheel will be rotatable on rear axle 39. By such arrangement, a rear wheel drive is provided and yet the tricycle allowed to turn corners with ease since the free wheel is not driven and will rotate at its own speed as determined by engagement with the ground.

Chain 58 is enclosed by a chain guard 84 and is driven by means of pedals 86, cranks 87 and crankshaft 88 (compare Figs. 2 and 4) through a sprocket 90 which is secured to crankshaft 88 by means of a set screw 91. Cranks 87 are also secured by means of set screw 92 to crankshaft 88 (see Fig. 4). Crankshaft 88 is rotatably supported from frame 20 by means of a bearing 95, which is fixed to and forms a part of a hanger 96 which is removably secured to frame 20 by being provided with a clevis portion 97 and a bolt 98 and nut 100. Bearing 95 includes a tubular outer race 103 secured to hanger 96, inner race 105, and bearings 106.

A tubular seat post 110 has a lower end 111 threadedly received by the hanger 96, as shown in Fig. 4, and at the upper end is adapted to telescopically receive a stem 114 of a seat 115. The upper end of post 110 is shown in detail in Fig. 5 and has an enlarged portion 116 which has a threaded bore 118 extending completely therethrough, said bore adapted to receive threaded studs 120 for the purpose of engaging the stem 114 (see Fig. 1) for adjustably supporting the stem within the post 110.

Hanger 96 is provided with slots 101 to permit adjustment of the hanger relative to the frame 20 for purposes to be described.

The post 110 is suitably braced by foot rest 53 which is adapted to be positioned in an inclined position as shown in Figs. 1 and 2 and in a horizontal position such as shown in Figs. 8, 9 and 11. In the position shown in Figs. 1 and 2, the foot rest member 53 does not perform a foot rest function but serves as a bracing member for the post 110. The foot rest member 53 is provided with a clevis 130 adapted to be secured to the post 110 by nuts 131 which thread onto threaded studs 120 and clamp the ends of the clevis against the enlargement 116 on posts 110.

Foot rest member 53 has the rear end thereof forked at 135, said foot rest member terminating in downwardly extending, bifurcated portions 52 previously referred to in connection with the manner of mounting rear axle 39, said construction allowing the foot rest member 53 to be readily removed from the axle 39 and nipples 46 by direct separating movement and in contrast to axial movement.

A step plate member 140 is secured in overlying position on the foot rest member 53 and covers the fork portion 135 of the foot rest member 53. Step plate 140 has depending sides 141 provided with slots 142 which are arranged longitudinally of the lower portion of the frame 20 and are adapted to register in part with vertical slots 145 provided in foot rest 53 to allow the step plate to be readily secured to the foot rest member by bolts 148 and nuts 149, as best appreciated by comparing Figs. 1 and 5.

Step plate member 140 is provided with laterally extending step portions 150 which are curved, as best shown in Fig. 5, so that the feet of a child are suitably supported by the step portion 150 when the step portion is inclined, as shown in Figs. 1 and 2, or in a horizontal position, such as shown in Figs. 8, 9 and 10. The curvature of the laterally extending portions 150 is such that the center of curvature is approximately at the radius of swing of the foot rest member 53, which is, for all practical purposes, the axis of rear axle 39.

The step plate member 140 has a clevis at 154 receivable through slots 157 in foot rest member 53, said clevis 154 being operable to allow attachment of the step plate member 140 to the frame 20 in the position of the parts as shown in Fig. 10, to be more fully described, when the foot rest member 53 is removed. Step plate member 140 is also provided with an aperture 155 to allow the step plate member to be secured to the hanger 96, as shown in Fig. 10, which is also to be described more in detail hereinafter.

The device disclosed in Figs. 1 and 2 is a chain driven, rear drive tricycle in which construction the seat 115 is supported by a post 110 which is braced by the foot rest member 53. Although a chain drive is shown for purposes of illustration, it is obvious that an equivalent drive such as a belt drive could be substituted therefor.

The device disclosed in Figs. 1 and 2 can be converted into a bicycle, such as shown in Figs. 6 and 7, by removing step plate 140, by the removal of nuts and bolts 148 and 149, and the addition of a rear fender 170, which fits within the forked portion 135 of foot rest 53 and is secured to the foot rest by suitable bracket means 171, as clearly shown in Fig. 6, and also supported by means of braces 172 as shown in Fig. 6. The rear axle 39, which is relatively long, is replaced by a shorter axle 177, and only one of the wheels 65 is used and is supported by axle 177 and between the prongs of rear fork 35. In constructing the bicycle shown in Figs. 6 and 7, it can be seen from Fig. 3 that the bearing 66 of wheel 65 just fits between the hub of sprocket 55 and the inner race of the right-hand bearing 40 as the parts are depicted in Fig. 3, the arrangement being shown in dot-dash line. The sprocket 55 is mounted on the short rear axle 177 in the same manner as it is mounted as shown in Fig. 3 on the long rear axle 39. The bicycle can, therefore, be constructed from the device shown in Figs. 1 and 2 by the addition of only two main pieces, the fender 170 and the rear axle 177, and by the elimination of the step plate 140, axle 39 and one wheel 65.

If desired, an outrigger having a T-shaped frame 179 and wheels 180 can be attached to the bicycle with the shank 181 of the T-shaped frame 179 being receivable through the rear end of frame 20, as best shown in Fig. 7 and secured to the frame by means of a set screw 183. Set screw 183 is threaded into the shank of rear fork 35, as best shown in Fig. 3, there being suitable clearance holes provided in the tubular wall of the end of frame 20 to clear the heads of the set screws.

A scooter construction, as shown in Figs. 11 and 12, can be provided by modifying the bicycle construction, shown in Figs. 6 and 7, in the following manner. The hanger 96, post 110, and seat 115 are completely removed along with sprocket 90, chain 58 and sprocket 55 on rear axle 177. The chain guard 84 is, of course, also removed. The outrigger 179 provided on the bicycle, which is an optional construction, would be also removed. The nuts 47 on the rear axle 177 of the construction shown in Figs. 6 and 7 are loosened to permit the swinging of foot rest 53 from the position shown in Fig. 6 to the position in Fig. 11, where the clevis 130 on foot rest member 53 embraces the frame 20 and is secured to the frame by a suitable nut and bolt 189, as shown in Figs. 11 and 12. To restate, the conversion of the scooter from the bicycle comprises in removing the drive to the rear axle, the seat post and seat; and the foot rest member 53 is swung to a horizontal position to provide a foot rest.

The scooter handle bar arrangement is made up as follows: Post 110 is of a size to fit within the bearing 21 of the part of frame 20, and is adapted to drivingly engage the fork 23. The shank 181 of T-shaped frame 179 which was used to support the outrigger wheels 180 on the bicycle, is inserted into post 110 and secured by studs 120. Suitable handle bar grips can be applied to frame 179. As an alternate arrangement, the regular handle bars 27, as shown in the construction of Figures 1, 2, 6 and 7, may be used with scooter as shown in Figures 11, 12 and 13.

The vehicle disclosed in Figs. 1 and 2, besides being converted into a bicycle and a scooter, can be converted into a short frame, front drive tricycle, and a long frame, front drive tricycle. The long frame, front drive tricycle is disclosed in Figs. 8 and 9 and the conversion takes place as follows: The drive mechanism, including hanger 96, crankshafts 88, sprocket 90, chain 58 and sprocket 55 on the rear axle 39, is removed, but the rear axle is utilized in the form of the invention disclosed in Figs. 8 and 9. The step plate 140, which is removed for the construction of a bicycle and a scooter is left in place for the construction of the long frame front wheel tricycle, as disclosed in Figs. 8 and 9, but the post 110 and seat 115 are removed and the foot rest member 53 is swung downwardly where the clevis 130 thereon embraces the frame and is secured to the frame by nut and bolt 189. Stem 114 of seat 115 is receivable within a bore 195 in frame 20 as shown in Fig. 9 and adapted to be secured to the frame in adjusted position by means of suitable screws 197. The cranks 87 and pedals 86 are secured on the protruding ends of front axle 26, as shown in Figs. 8 and 9, by means of their set screws 92, front axle 26 having the same cross-sectional dimensions and configurations as the crank 88 and the rear axles 39 and 177. With this arrangement, a long frame carry-all front wheel drive tricycle is provided, which allows at least three children to be supported by the tricycle, one child being seated on seat 115, another child standing on the foot rest member 53 and a third child standing on the step plate 140.

A short frame front drive tricycle can be provided and constructed from the device disclosed in Fig. 1 by removing the drive and utilizing the hanger 96 by fastening the hanger to the rear end of frame 20 by means of bolt 36 and nut 37, this construction being best appreciated by comparing Figs. 3 and 10, bolt 36 being receivable through the slots 101 in the clevis portion 97 of hanger 96. The slots 101 in the hanger 96 permit the disposition of the hanger such that the threaded bore therein assumes a vertical position as the parts are depicted in Fig. 10 to enable the step plate 140 to be secured to the hanger by means of a screw 199 receivable through the aperture or opening 155 in step plate 140. The foot rest member 53 is removed from the device disclosed in Figs. 1 and 2 along with the forked extension 35 and the step plate member 140 is detached from the foot rest member 53 and secured to the frame by the screw 199, as described above and by means of a nut and bolt 200, see Fig. 10. The seat 115 and the stem 114 are secured in the same position as in the construction for the long frame body. The real difference, therefore, between the long frame tricycle and the short frame tricycle is the removal of the foot rest member 53 and the rear fork 35 and the provision of a foot supporting member on the short frame 20 by means of the step plate member 140, as clearly shown in Fig. 10.

By the present invention, a convertible vehicle has been provided which can be transformed by a suitable selection of parts into any one of a multiplicity of different types of vehicles. It is contemplated that the various parts disclosed can be assembled in other relationships but the primary relationship has been shown. A minimum number of parts for the various vehicles has been provided which parts are simple in construction and which allow for ready conversion from one construction to the other. By the convertible invention of the present invention, a purchaser may buy a single vehicle which can be transformed to meet the needs of a growing child so as to provide a short frame tricycle, as shown in Fig. 10, and later a long frame, front wheel drive tricycle, as shown in Figs. 8 and 9. As the child grows older, the construction shown in Figs. 1 and 2 of a rear wheel drive tricycle can be provided and then as the child grows still older, a bicycle as shown in Fig. 6 or a scooter shown in Fig. 11 can be provided. It is obvious, of course, that the different arrangements can be obtained as desired, so that the child at any single age can be provided with any of the different modifications as desired.

Having thus described my invention, what I claim and desire to secure by Letters Patent is:

1. A convertible vehicle including a wheeled vehicle frame, a seat post removably connected at its lower end to the frame, a seat on the upper end of the post, a foot rest member connected to the frame for movement from an inclined position to a horizontal position and having means on its upper end for connection to the upper end of the post when in its inclined position for bracing the same and when said seat post is removed to the frame when in its horizontal position to provide a foot rest, said foot rest member presenting a relatively wide generally flat upper surface to support the foot of the rider when the foot rest member is in its horizontal position.

2. A convertible vehicle including a wheeled vehicle frame, a seat post removably connected at its lower end to the frame, a seat on the upper end of the post, a foot rest member connected to the frame for movement from an inclined position to a horizontal position and having a clevis on the upper end thereof enabling connection to the upper end of the post when in its inclined position for bracing the same or when said seat post is removed to the frame when in its horizontal position to provide a foot rest, said foot rest member presenting a relatively wide generally flat upper surface to support the foot of the rider when the foot rest member is in its horizontal position.

3. A convertible vehicle including a wheeled vehicle frame, a seat post removably connected at its lower end to the frame, a seat on the upper end of the post, a foot rest member connected to the frame for movement from an inclined position to a horizontal position and having means on its upper end for connection to the upper end of the post when in its inclined position for bracing the same and when said seat post is removed to the frame when in its horizontal position to provide a foot rest, a step plate secured to the foot rest member and having lateral step portions for providing support for the feet of a person in either position of the foot rest member.

4. A convertible vehicle including a wheeled vehicle frame, a seat post removably connected at its lower end to the frame, a seat on the upper end of the post, a foot rest member connected to the frame for movement from an inclined position to a horizontal position and having means on its upper end for connection to the upper end of the post when in its inclined position for bracing the same and when said seat post is removed to the frame when in its horizontal position to provide a foot rest, a step plate secured to the foot rest member and having laterally disposed curved step portions, the center of curvature of each being approximately at the axis of swing of the foot rest member to thereby provide support for the feet of a person in either position of the foot rest member.

5. A convertible vehicle including a wheeled vehicle frame, a seat post removably connected at its lower end to the frame, a seat on the upper end of the post, a foot rest member connected to the frame for movement from an inclined position to a horizontal position and having a clevis on the upper end thereof enabling connection to the upper end of the post when in its inclined position for bracing the same or when said seat post is removed to the frame when in its horizontal position to provide a foot rest, a step plate secured to the foot rest member and having laterally disposed curved step portions, the center of curvature of each being approximately at the axis of swing of the foot rest member to thereby provide support for the feet of a person in either position of the foot rest member.

6. A convertible vehicle including a rear axle having at least one wheel non-rotatably mounted thereon, a vehicle frame having at the rear end and means for rotatably supporting the rear axle and having a removable extension having means for rotatably supporting the rear axle whereby the vehicle can be shortened or lengthened, means including a removable chain drive to the rear axle enabling when attached the driving of the rear wheel and when removed free rotation of the rear wheel, a seat post removably connected at its lower end to the frame, a seat having a stem receivable in the upper end of the seat post and also receivable in the frame forwardly of the post to enable provision of a seat when the post is removed, a foot rest member removably mounted by its rear end on the extension for movement from an inclined position to a horizontal position and having on its upper end means for connection to the upper end of the post to brace the same or when said seat post is removed to the frame to provide a foot rest and being removable to enable shortening of the vehicle, a step plate having lateral step portions and being removably secured to the foot rest member and having means for connection to the frame when the step plate is separated from the foot rest member and said foot rest member is removed from the frame.

7. A convertible vehicle including a rear axle having at least one wheel rotatably mounted thereon, said wheel having means for permitting the wheel to be non-rotatably secured to the axle, a vehicle frame having at the rear end means for rotatably supporting the rear axle and having a removable extension also having means for rotatably supporting the rear axle whereby the vehicle can be shortened or lengthened, means including a removable chain drive from mid-frame to the rear axle to enable when attached driving of the rear wheel and when removed free rotation of the rear wheel, a seat post removably connected at its lower end to the frame, a seat having a stem receivable in the upper end of the seat post and also receivable in the frame forwardly of the post to enable provision of a seat when the post is removed, a foot rest member removably mounted by its rear end on the extension for movement from an inclined position to a horizontal position and having means on its upper end for connection to the upper end of the post when in its inclined position to brace the same or when said seat post is removed to the frame when in its horizontal position to provide a foot rest and being removable to enable shortening of the vehicle, a step plate having lateral step portions and being removably secured to the foot rest member and having means for connection to the frame when the step plate is separated from the foot rest member and said foot rest member is removed from the frame.

8. A convertible vehicle including a rear axle having a wheel rotatably mounted on each end thereof, each wheel having means permitting the wheel to be non-rotatably secured to the axle, a vehicle frame having at the rear end means for rotatably supporting the rear axle and having a removable extension having means for rotatably supporting the rear axle whereby the vehicle can be shortened or lengthened and the axle mounted on the shortened or lengthened vehicle, means including a removable chain drive from mid-frame to the rear axle to enable when attached driving the rear wheel and when removed free rotation of the rear wheel, a seat post removably connected at its lower end to the frame, a seat having a stem receivable in the upper end of the seat post and also receivable in the frame forwardly of the post to enable provision of a seat when the post is removed, a bracing foot rest member removably mounted by its rear end on the extension for movement from an inclined position to a horizontal position and having on its upper end means for enabling connection to the upper end of the post when in its inclined position to brace the same and when said seat post is removed to the frame when in its horizontal position to provide a foot rest and being removable to enable shortening of the frame of the vehicle, a step plate having lateral step portions and being removably secured to the foot rest member and having means for connection to the frame when the step plate is separated from the foot rest member and said foot rest member is removed from the frame.

9. A convertible vehicle including a rear axle having a wheel rotatably mounted on each end thereof, each wheel having means permitting the wheel to be non-rotatably secured to the axle, a vehicle frame having at the rear end means for rotatably supporting the rear axle, means including a removable chain drive from mid-frame to the rear axle to enable when attached driving of the rear wheels, a seat post removably secured at its lower end to the frame, a seat having a stem receivable in the upper ends of the seat post and also receivable in the frame forwardly of the post to enable the provision of a seat when the post is removed, a foot rest member adjustably mounted by its rear end to the frame for movement from an inclined position to a horizontal position and having at its upper end means for connection to the upper end of the post when in its inclined position to brace the same or when said seat post is removed to the frame when in its horizontal position to provide a foot rest, and a step plate secured to the foot rest member and having lateral step portions arranged to support a person when the foot rest member is in either its inclined or horizontal position.

10. A convertible vehicle including a rear axle having a wheel rotatably mounted on each end thereof, each wheel having means permitting the wheel to be non-rotatably secured to the axle, a vehicle frame having at the rear end means for rotatably supporting the rear axle, means including a removable chain drive from mid-frame to the rear axle to enable when attached driving of the rear wheels, a seat post removably secured at its lower end to the frame, a seat having a stem received in the upper end of and connected to the seat post and being removable and receivable in the frame forwardly of the post to enable the provision of a seat when the post is removed, a foot rest member adjustably mounted by its rear end to the frame for movement from an inclined position to a horizontal position and having at its upper end means for connection to the upper end of the post when in its inclined position to brace the same or when said seat post is removed to the frame when in its horizontal position to provide a foot rest, a step plate secured to the foot rest member having lateral disposed curved step portions for providing support for the feet of a person when the foot rest member is in either its inclined or horizontal position.

11. A convertible vehicle including a rear axle having at least one wheel rotatably mounted thereon having means for permitting the wheel to be non-rotatably secured to the axle, a vehicle frame having a forked rear end adapted to receive the rear wheel and having bearings for rotatably supporting the rear axle, means including a removable chain drive from the mid-frame to the rear axle enabling when attached the driving of the rear wheel and when removed the free rotation of the rear wheel, a seat post removably connected at its lower end to the frame, a seat on the upper end of the post, a foot rest member having a forked rear end for clearing the rear wheel when the rear wheel is mounted between the forked end of the frame and being mounted on the forked rear end of the frame for movement from an inclined position to a horizontal position and having means on its upper end for connection to the upper end of the post when in its inclined position to brace the same or when said seat post is removed to the frame when in its horizontal position to provide a foot rest.

12. A convertible vehicle including a rear axle having at least one wheel rotatably mounted thereon having means for permitting the wheel to be non-rotatably secured to the axle, a vehicle frame having a forked rear end adapted to receive the rear wheel and having bearings for rotatably supporting the rear axle, means including a removable chain drive from mid-frame to the rear axle enabling when attached the driving of the rear wheel and when removed free rotation of the rear wheel, a seat post removably connected at its lower end to the frame, a seat having a stem received in the upper end of and connected to the seat post and being removable and receivable in the frame forwardly of the post to enable the provision of a seat when the post is removed, and a foot rest member having a forked rear end for clearing the rear wheel when the rear wheel is mounted between the forked end of the frame and being mounted on the forked end of the frame for movement from an inclined position to a horizontal position and having on its upper end means for connection to the upper end of the post when in its inclined position to brace the same or when said seat post is removed to the frame when in its horizontal position to provide a foot rest.

13. A convertible vehicle including a rear axle having one wheel non-rotatably mounted thereon, a vehicle frame having a forked rear end adapted to receive the rear wheel and bearings for rotatably supporting the rear axle, means including a removable chain drive from mid-frame to the rear axle enabling when attached the driving of the rear wheel and when removed the free rotation of the rear wheel, a seat post removably connected at its lower end to the frame, a seat on the upper end of the post, a foot rest member having a forked rear end for clearing the rear wheel and connected to the rear forked end of the frame for movement from an inclined position to a horizontal position and having a clevis on its upper end for connection to the upper end of the post or the frame to provide a foot rest.

14. A convertible vehicle including a rear axle having a wheel rotatably mounted on each end thereof, each wheel having means permitting the wheel to be non-rotatably secured to the axle, a vehicle frame having a removable extension provided with bearings for removably rotatably supporting the rear axle, whereby said frame can be shortened by removal of the extension, means including a removable chain drive from mid-frame to the rear axle enabling when attached the driving of the rear wheels and when removed the free rotation of the rear wheels, said last-named means including a crankshaft and a hanger removably rotatably supporting the crankshaft and being secured to the frame forwardly of the juncture of the extension and the frame in which position it supports the crankshaft, said hanger having means for connection to the frame at the rear end thereof when the extension is removed in which position it is adapted to receive the axle for removably rotatably supporting the same, and a seat adapted to be supported by the frame at the point where said crankshaft hanger is secured to the frame when said crankshaft hanger is in place and adapted to be supported by said frame forward of said point when said crankshaft is removed.

15. A convertible vehicle including a rear axle having a wheel rotatably mounted on each end thereof, each wheel having means permitting the wheel to be non-rotatably secured to the axle, a vehicle frame having a removable extension provided with bearings for removably rotatably supporting the rear axle, whereby said frame can be shortened by removal of the extension, means including a removable chain drive from mid-frame to the rear axle enabling when attached the driving of the rear wheels and when removed the free rotation of the rear wheels, said last-named means including a crankshaft and a hanger removably rotatably supporting the crankshaft and being securable to the frame forwardly of the juncture of the extension and the frame in which position it supports the crankshaft or to the frame at the juncture of the extension and the frame when the extension is removed in which position it is adapted to receive the axle for removably rotatably supporting the same, said crankshaft having the same cross-sectional dimensions and configuration as the axle to enable the hanger to receive either the axle or the crankshaft, and a seat adapted to be supported by the frame at the point where said crankshaft hanger is secured to the frame when said hanger is in its first mentioned position, and adapted to be supported by said frame forward of said point when said hanger is in its second mentioned position.

16. A convertible vehicle including a rear axle having a wheel rotatably mounted on each end thereof, each wheel having means permitting the wheel to be non-rotatably secured to the axle, a vehicle frame having a removable extension provided with bearings for removably rotatably supporting the rear axle, whereby said frame can be shortened by removal of the extension, means including a removable chain drive from mid-frame to the rear axle enabling when attached the driving of the rear wheels and when removed the free rotation of the rear wheels, said last-named means including a crankshaft and a hanger removably rotatably supporting the crankshaft and being secured to the frame forwardly of the juncture of the extension and the frame in which position it supports the crankshaft, said hanger having means for connection to the frame at the rear end thereof when the extension is removed in which position it is adapted to receive the axle for removably rotatably supporting the same, a seat adapted to be post removably connected at its lower end to the frame at the point where said crankshaft hanger is secured to the frame when said hanger is in its first mentioned position, and adapted to be supported by said frame forward of said point when said hanger is in its second mentioned position, a seat having a stem received in the upper end of and connected to the seat post and being removable and receivable in a hole provided in the frame forwardly of the post to enable provision of a seat when the post is removed.

17. A convertible vehicle including a rear axle having a wheel rotatably mounted on each end thereof, each wheel having means permitting the wheel to be non-rotatably secured to the axle, a vehicle frame having a removable extension provided with bearings for removably rotatably supporting the rear axle, whereby said frame can be shortened by removal of the extension, means including a removable chain drive from mid-frame to the rear axle enabling when attached the driving of the rear wheels and when removed the free rotation of the rear wheels, said last-named means including a crankshaft and a hanger removably rotatably supporting the crankshaft and being secured to the frame forwardly of the juncture of the extension and the frame in which position it supports the crankshaft, said hanger having means for connection to the frame at the rear end thereof when the extension is removed in which position it is adapted to receive the axle for removably rotatably supporting the same, a seat supported by the frame, and a step plate having lateral step portions and being secured to the extension, and having means for securement to the hanger when the hanger is secured to the rear end of the frame.

18. A convertible vehicle including a rear axle having a wheel rotatably mounted on each end thereof, each wheel having means permitting the wheel to be non-rotatably secured to the axle, a vehicle frame having a removable extension provided with bearings for removably rotatably supporting the rear axle, whereby said frame can be shortened by removal of the extension, means including a removable chain drive from mid-frame to the rear axle enabling when attached the driving of the rear wheels and when removed the free rotation of the rear wheels, said last-named means including a crankshaft and a hanger removably rotatably supporting the crankshaft and being securable to the frame forwardly of the juncture of the extension and the frame in which position it supports the crankshaft or to the frame at the juncture of the extension and the frame when the extension is removed in which position it is adapted to receive the axle for removably rotatably supporting the same, a seat post removably connected at its lower end to the hanger, and a seat having a stem received in the upper end of and connected to the seat post and being removable and receivable in the frame forwardly of the post to enable provision of a seat when the post is removed.

19. A convertible vehicle including a rear axle having a wheel rotatably mounted on each end thereof, each wheel having means permitting the wheel to be non-rotatably secured to the axle, a vehicle frame having a removable extension provided with bearings for removably rotatably supporting the rear axle, whereby said frame can be shortened by removal of the extension, means including a removable chain drive from mid-frame to the rear axle enabling when attached the driving of the rear wheels and when removed the free rotation of the rear wheels, said last-named means including a crankshaft and a hanger removably rotatably supporting the crankshaft and being securable to the frame forwardly of the juncture of the extension and the frame in which position it supports the crankshaft or to the frame at the juncture of the extension and the frame when the extension is removed in which position it is adapted to receive the axle for removably rotatably supporting the same, said hanger having a threaded bore and means for arranging the bore at an angle when said hanger supports the crankshaft and vertically when the hanger supports the axle, a seat post threaded at its lower end into the hanger when the hanger supports the crankshaft and being removable when the hanger supports the axle, a seat having a stem received in the upper end of and connected to the seat post and being removable and receivable in the frame forwardly of the post to enable the provision of a seat when the post is removed, and a step plate having lateral step portions and securable to the extension when the extension is attached to the frame and to the hanger by means of a screw when the hanger supports the axle.

WAYNE WIESNER.
FRANK FIELD.

References Cited in the file of this patent

UNITED STATES PATENTS

| Number | Name | Date |
|---|---|---|
| 978,015 | Gentle | Dec. 6, 1910 |
| 1,386,124 | Littlefield | Aug. 2, 1921 |
| 1,416,864 | Parkes | May 23, 1922 |
| 2,346,950 | Strehlow | Apr. 18, 1944 |
| 2,468,933 | Jones | May 3, 1949 |

FOREIGN PATENTS

| Number | Country | Date |
|---|---|---|
| 306,720 | Italy | Mar. 30, 1933 |
| 682,562 | France | May 30, 1930 |